2 Sheets--Sheet 1.

M. JOHNSON,

Hoe.

No. 6,419.

Reissued May 4, 1875.

WITNESSES

Robert Everett,

Geo. E. Upham

INVENTOR

Moses Johnson,

Chipman & Brown & Co,

ATTORNEYS

2 Sheets--Sheet 2.

M. JOHNSON,

Hoe.

No. 6,419. Reissued May 4, 1875.

WITNESSES

Robert Everett,

Geo. E. Upham.

INVENTOR

Moses Johnson.

Chipman & Fourm & Co.,

ATTORNEYS

UNITED STATES PATENT OFFICE.

MOSES JOHNSON, OF THREE RIVERS, MICHIGAN, ASSIGNOR TO THE UNION MANUFACTURING COMPANY.

IMPROVEMENT IN HOES.

Specification forming part of Letters Patent No. 159,332, dated February 2, 1875; reissue No. 6,419, dated May 4, 1875; application filed March 30, 1875.

*To all whom it may concern:*

Be it known that I, MOSES JOHNSON, of Three Rivers, in the county of St. Joseph and State of Michigan, have invented a new and useful Improvement in Hoes; and I do hereby declare that the following is a full, clear, and exact description of the construction and operation of the same, reference being had to the annexed drawings making part of this specification, in which—

Figure 1:
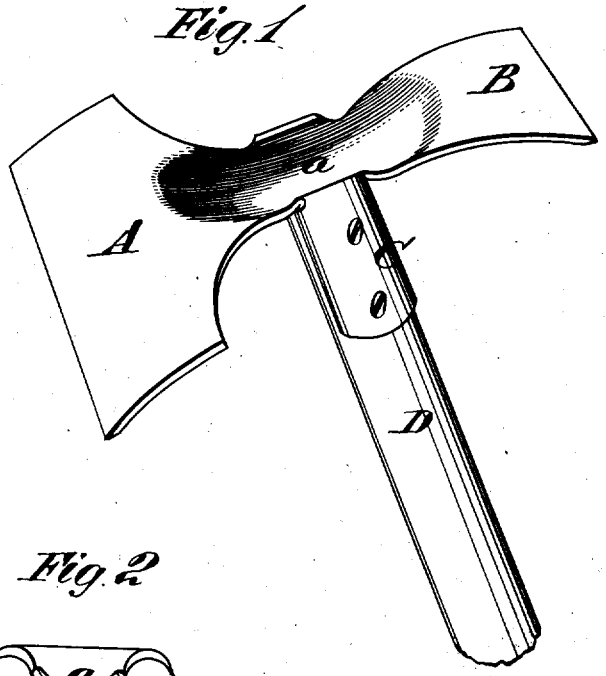
Figure 2:
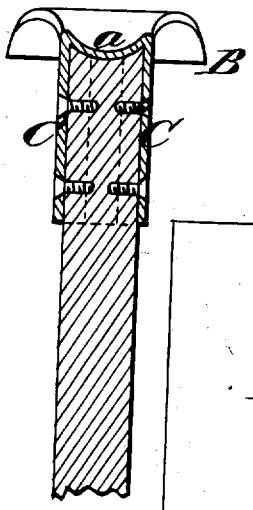
Figure 3:
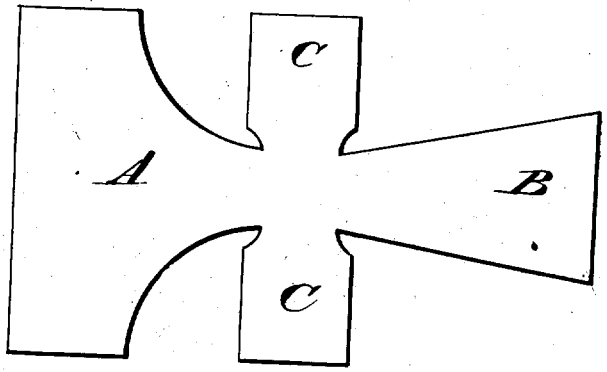
Figure 4:
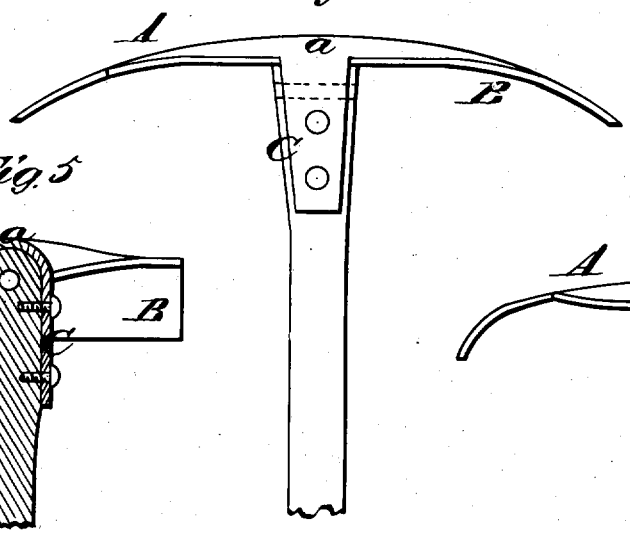
Figure 5:
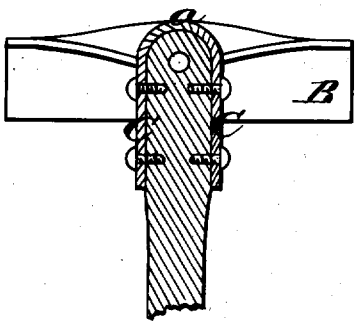
Figure 7:
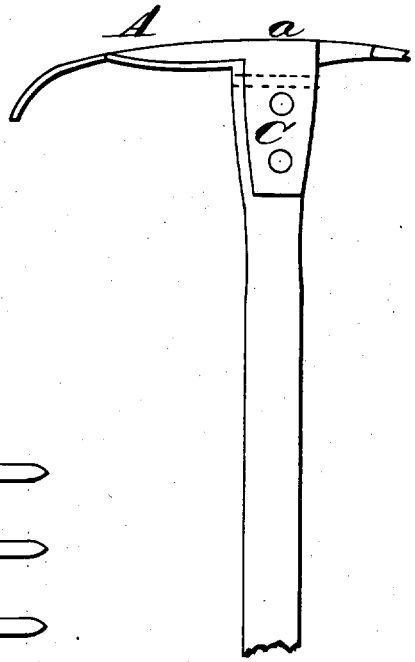
Figure 8:
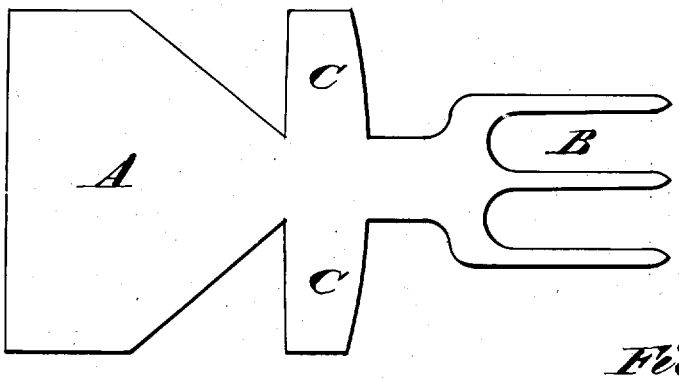
Figure 6:
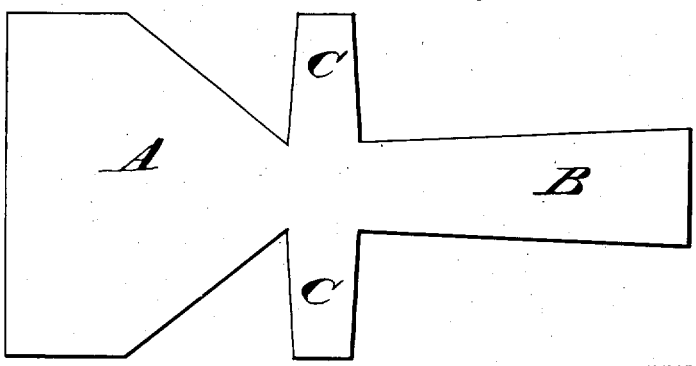

Figure 1 is a perspective view of my hoe. Fig. 2 is a transverse section through the same. Fig. 3 is a plan view of the hoe-blank. Fig. 4 is a modification of my hoe. Fig. 5 is a transverse sectional view of Fig. 4. Figs. 6, 7, and 8 are views of modifications of my hoe, Figs. 6 and 8 being of the hoe-blank.

This invention has relation to hoes; and it consists in a hoe which is stiffened at its contracted part by making such part concave or convex transversely, forming an arch from edge to edge, and flaring toward the blade, and flush therewith at its terminus; also in a hoe which is cut out of a single piece of metal, with ears on opposite sides of a narrow transversely-curved portion, as will be understood from the following description.

In the annexed drawings, A represents a broad hoe-blade, and B a smaller blade, while C C designate two ears, which, when they are bent, as shown in the drawings, serve, in connection with screws or rivets, as means for securing the hoe to a handle, D. The four parts, A, B, and C C, are struck out of a piece of sheet metal, as represented in Fig. 3, which is the blank for a double-blade hoe. The narrow connecting-portion *a* between the blades is curved transversely, the concavity, or convexity, as the case may be, extending some distance into each one of the blades. The ears are then turned down to form the attaching-socket for the handle D. I secure the ears to the handle my means of screws or rivets. The transverse curve given to the contracted part *a* is for the purpose of strengthening and stiffening this part, and it also, in a measure, strengthens and stiffens the blades. If desirable, one of the blades may be omitted.

The modifications shown on Sheet 2 consist in making the attaching-portions C C′ flat instead of curved, and also in making the portion *a* convex instead of concave.

What I claim as new, and desire to secure by Letters Patent, is—

1. A hoe, the contracted portion *a* of which forms an unbroken arch from edge to edge in cross-section, and flares toward the blade, and is flush therewith at its terminus, substantially as shown and described.

2. In a hoe, the ears C C, combined with the narrow curved-portion *a*, substantially as described.

In testimony that I claim the above, I have hereunto subscribed my name in the presence of two witnesses.

MOSES JOHNSON.

Witnesses:
J. J. ARNOLD,
JAMES W. FESSENDEN.